United States Patent [19]

Mallory et al.

[11] 4,296,461

[45] Oct. 20, 1981

[54] BATTERY PACKAGE WITH DC TO DC CONVERTER

[75] Inventors: Henry R. Mallory, Greenwich, Conn.; Steven J. Nichols, North Tarrytown, N.Y.

[73] Assignee: Duracell International Inc., Bethel, Conn.

[21] Appl. No.: 7,456

[22] Filed: Jan. 29, 1979

[51] Int. Cl.³ .................... H02M 3/335; H01M 2/34
[52] U.S. Cl. .................................. 363/22; 363/133; 307/150; 429/7
[58] Field of Search .................... 363/22-25, 363/59-61, 55-56, 133-134, 146; 307/150, 110; 429/7, 122-123

[56] References Cited

U.S. PATENT DOCUMENTS

| 3,009,115 | 11/1961 | Johnson | 363/133 X |
| 3,079,525 | 2/1963 | Tap | 363/18 |
| 3,106,672 | 10/1963 | Mills | 363/16 X |
| 3,243,683 | 3/1966 | Ackley | 363/23 |
| 3,348,119 | 10/1967 | Webb | 363/22 |
| 3,453,520 | 7/1969 | Mas | 363/22 |
| 3,777,248 | 12/1973 | Vermolen | 363/22 |
| 3,843,919 | 10/1974 | Yamamura et al. | 363/25 |
| 3,885,991 | 5/1975 | Finkel | 429/7 X |
| 4,016,475 | 4/1977 | Makino | 363/22 |
| 4,121,115 | 10/1978 | de Méré | 307/150 |

FOREIGN PATENT DOCUMENTS 2335987   7/1977   France ........................ 363/18

Primary Examiner—William M. Shoop
Assistant Examiner—Peter S. Wong
Attorney, Agent, or Firm—Ronald S. Cornell; Israel Nissenbaum; Martin M. Glazer

[57]    ABSTRACT

A battery package having a casing which contains at least one electrochemical cell electrically connected to a DC to DC converter. A pair of electrical connections are located on the casing to electrically connect the battery package to a load. The converter conducts and the cell discharges only when a load is present across the electrical connection.

10 Claims, 4 Drawing Figures

BATTERY PACKAGE WITH DC TO DC CONVERTER

FIELD OF THE INVENTION

This invention relates to a battery package including at least one electrochemical cell and a DC to DC converter, and more particularly to such a package wherein the converter has load switching capabilities.

BACKGROUND OF THE INVENTION

Electrochemical cells produce a specific voltage which is dependent upon the materials making up the cell. Within fairly narrow limits, a desired voltage can be produced from a single cell through the judicious selection of materials. The maximum voltage achievable from a single cell through this method is less than four volts because of the inherent limited difference in voltage potentials of the materials making up the cell. The practical number of available voltages is further reduced by the fact that only a few of the chemical elements can be successfully combined to produce a usable cell. Many theoretically possible cells can not be manufactured successfully for various reasons or they cannot meet the requirements of use under real life conditions.

In the past, batteries producing voltages higher than that of a single cell have been manufactured by connecting a plurality of cells in series. The individual voltages of all the cells are added to produce a final battery voltage which is the sum of the component cell voltages. With the proper choice of component cells, many desired voltages can be achieved.

Another limitation in designing high voltage batteries is the weight and volume of the finished battery. A sixty volt battery requires forty zinc/carbon cells or twenty lithium/sulfur dioxide cells. Such a battery must be large and heavy because of the large number of component cells. Since a part of the weight and volume is for packaging, and not for energy production, a battery with a large number of small cells has a lower energy density than a similarly sized battery with a smaller number of large cells. In order to obtain voltages other than those available from known cells, the user in the past has had to modify his equipment to use the available voltages, or has had to use a voltage converter in combination with his equipment.

Multiple cell batteries have other inherent problems. If one cell fails, the whole battery can fail since the cells are connected in series. This decreases the reliability of the battery. The problem becomes more serious as the number of cells increases. The complete discharge of one cell, before the other cells in a battery discharge, can cause cell reversal. Depending upon the chemical makeup of the cell, it may cause damage to the battery, and to the device powered by the battery. This can be a serious problem with any type of cell, but especially with cells containing lithium, in which cell reversal is suspected as a cause of serious problems. Obviously, the fewer the number of cells used in a battery, the less the chance of cell reversal, and of battery failure.

A problem related to cell reversal, but not limited to multicell batteries, is that of battery recharging. Many electrical devices, under certain circumstances, can produce a voltage of polarity opposite to that of the cell. Such reverse voltage will tend to recharge the cell with an undesirable effect which is similar to the reversal of a cell in the battery.

THE INVENTION

It has now been found that desired voltages within a wide range can be obtained by using the battery package described and claimed herein. The battery package utilizes a DC to DC converter within the battery package. The converter is electrically connected to the cell or cells located within the package. The battery package can utilize electrical means for load switching, which means can also comprise a portion of the converter. The battery package of the present invention is completely interchangeable with most previously known batteries and can be used in many applications where known batteries can not be used.

The invention will be more fully understood from the following discussion, as well as be reference to the accompanying drawings.

DETAILED DESCRIPTION OF THE DRAWINGS

Figure 1:
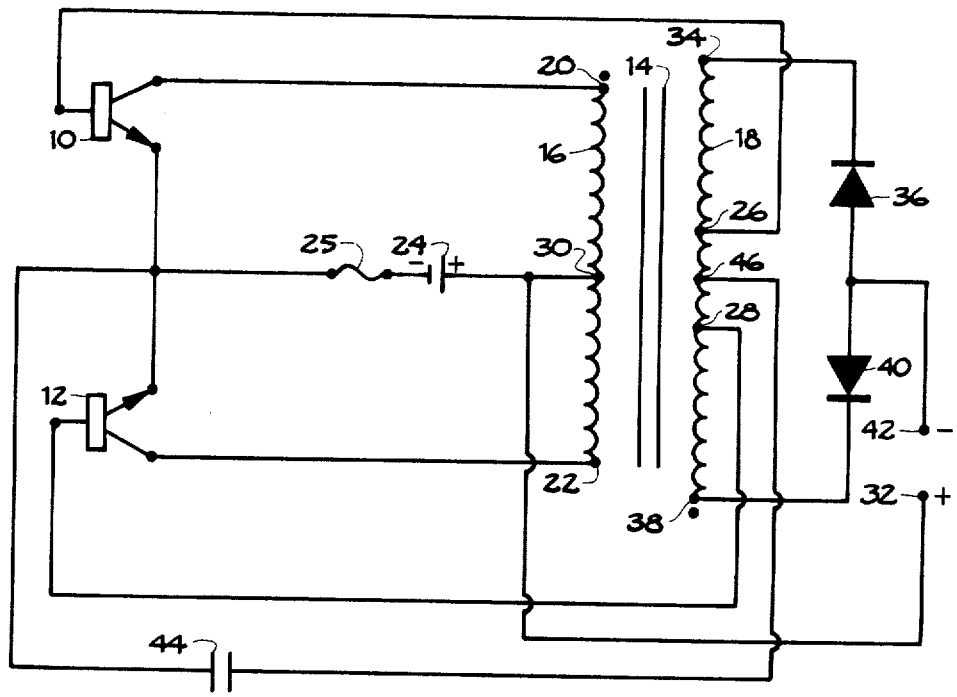
FIG. 1 shows an embodiment of the converter of the present invention using NPN type transistors and including means to prevent current flow through the converter unless a load is connected to the output of the converter.

In an embodiment of the DC to DC converter circuit of the present invention, shown in FIG. 1, the circuit includes first 10 and second 12 transistors of the NPN type having emitter, collector and base electrodes, and a saturable inverter transformer 14 having a center tapped primary winding 16 and a multiple tapped secondary winding 18. The transistors 10, 12 are preferably low leakage silicon transistors. Other transistors, having higher leakage currents, such as germanium transistors, can be used in instances where leakage and the resulting electrochemical cell drain during storage are not a problem.

The collector electrode of the first transistor 10 is connected to one end 20 of the primary winding 16 and the collector electrode of the second transistor 12 is connected to an opposite end 22 of the primary winding 16. The emitter electrode of each transistor 10, 12 is connected to a negative terminal of a direct current power source, here an electrochemical cell 24. A fuse 25 can also be connected in series between the emitter electrodes and the negative terminal of the cell 24. The fuse 25 is adapted to open if the cell 24 is discharged at a rate above a preselected rate.

The base electrode of the first transistor 10 is connected to a first tap 26 on the secondary winding 18. The base electrode of the second transistor 12 is connected to a second tap 28 on the secondary winding 18.

A positive terminal of the cell 24 is connected to a center tap 30 of the primary winding 16 and also to a positive output connection 32 of the circuit. One end 34 of the secondary winding 18 is connected to a cathode of a first diode 36 and the other end 38 of the winding 18 is connected to a cathode of a second diode 40. Anodes of the two diodes 36, 40 are connected to a negative output connection 42 of the circuit. The two outputs 32, 42 shown in this embodiment form the means for electrically connecting the output from the converter to the load (not shown). Load switching, electrical means for preventing current flow through the converter circuit unless a load is connected to the output of the converter, is accomplished in the preferred embodiments of the invention by designing the converter circuit so that the load is connected in the base drive circuit only during circuit use. In the embodiment shown, the load is connected across the output connections 32, 42. When no load is present, the base drive circuit is open, and only leakage current of a few nanoamperes flows through the transistors 10, 12. When a load is connected into the circuit, the base drive circuit is completed. The transistors 10, 12 are biased and current flows throughout the circuit.

The conducting transistors 10, 12 cause the circuit to oscillate and they produce a voltage across portions of the secondary winding 18. A voltage will appear only at that portion of the tapped secondary 18 connected to the transistor 10 or 12 which is conducting at that time, since during circuit oscillation only one transistor 10 or 12 conducts at any given time.

The diodes 36, 40 permit the output voltage to be supplied from each conducting portion of the secondary winding 18, thus producing full wave rectification. The output is supplied alternatively from either the first tap 26 and the end 38 of the secondary winding 18 or between the second tap 28 and the second end 34 of the secondary winding 18. The output voltage of the circuit is dependent upon the ratio of one-half of the primary winding 16, and the tapped portion of the secondary winding 18 which is conducting. Since the cell 24 is in series with the output connections 32, 42, its voltage must be added to the voltage produced by the secondary winding 18. In the preferred embodiment the ratios of primary winding 16 to secondary winding 18 can vary from about 1 to 2 to about 1 to 50.

Since the diodes 36, 40 permit the output voltage to be taken from only that portion of the secondary 18 conducting during each portion of the oscillation of the circuit, the polarity of the output voltage remains constant during circuit oscillation. No further rectification is necessary. Filtering devices such as capacitors (not shown) can be connected across the output connections 32, 42 to reduce alternating current ripple. The diodes 36, 40, further prevent cell 24 charging by blocking any cell charging potential.

The voltage applied between the base and emitter of each transistor 10, 12 is determined by the ratio of the turns of one half of the primary 16, and the number of turns in that portion of the secondary 18 between the first 26 and second taps 28. The number of turns in this tapped portion of the secondary 18 is determined by the position of the taps 26, 28, and not the total number of turns in the secondary 18. This permits almost any output voltage to be produced across the secondary 18, while maintaining a voltage between the emitter and base below the breakdown voltage of the transistors 10, 12. The ability of the circuit to maintain a low voltage between the emitter and base of the transistors 10, 12 permits low leakage silicon transistors to be used in the circuit, instead of the high leakage germanium transistors which have a higher emitter to base breakdown voltage.

It has been found that under some conditions the circuit continues to oscillate and draws current after the load is removed from the circuit. It has now been found that by connecting a capacitor 44 between a center tap 46 of the secondary 18 and the negative or positive terminal of the cell 24, the converter circuit ceases (except for leakage current) drawing current when the load is removed. In FIG. 1 the capacitor 44 is connected to the negative terminal. A circuit such as that shown in FIG. 1 has been found to have an efficiency of about 75 to 90 percent or even higher depending upon the step-up ratio, component selection, frequency, etc.

Figure 2:
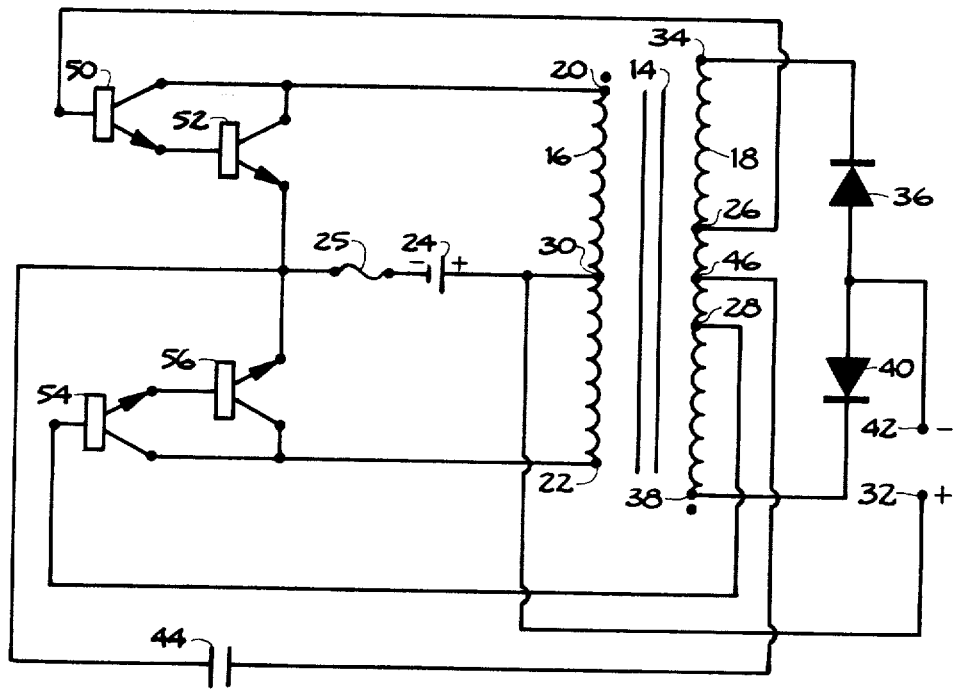
FIG. 2 shows a second embodiment of the converter of the present invention wherein Darlington type transistors or connections are used.

The circuit shown in FIG. 2 is the same as that shown in FIG. 1, except that the first transistor 10 has been replaced by first coupled component transistors 50, 52, and the second transistor 12 has been replaced by second coupled component transistors 54, 56.

Each set of coupled component transistors 50, 52 and 54, 56 can be located on a single chip to form a Darlington transistor. Alternatively, each couple can be two discrete transistors connected together in a Darlington type fashion as shown in FIG. 2. In either configuration the emitters of the transistors 52, 56 are tied together.

The base of the first transistor 50 of the coupled component transistors 50, 52, which is usually a small signal silicon transistor having a high gain and low power capacity, is connected to one end of the primary winding 16. The emitter of the transistor 50 is connected to the base of the second transistor 52 of the coupled component transistors 50, 52. The second transistor 52 is usually a power type transistor handling most of the current which passes through the coupled component transistors 50, 52. The emitter of the second transistor 52 is connected to the negative terminal of the cell 24.

The second set of coupled component transistors 54, 56 is interconnected in a fashion similar to the first couple 50, 52. The combination of signal and power transistors permits the ratios of the primary 16 and secondary windings 18 of the transformer 14 to be increased from those used in the circuit shown in FIG. 1. In the embodiment of the circuit shown in FIG. 2, the preferred ratio of primary 16 to secondary coils 18 varies from between about 1 to 20 and 1 to 500. This, in turn, produces a much higher output voltage from a given input voltage than in the circuit shown in FIG. 1. The two transistors added to the circuit of FIG. 1 reduced the overall efficiency of the circuit of FIG. 2 to about sixty-five percent.

Figure 3:
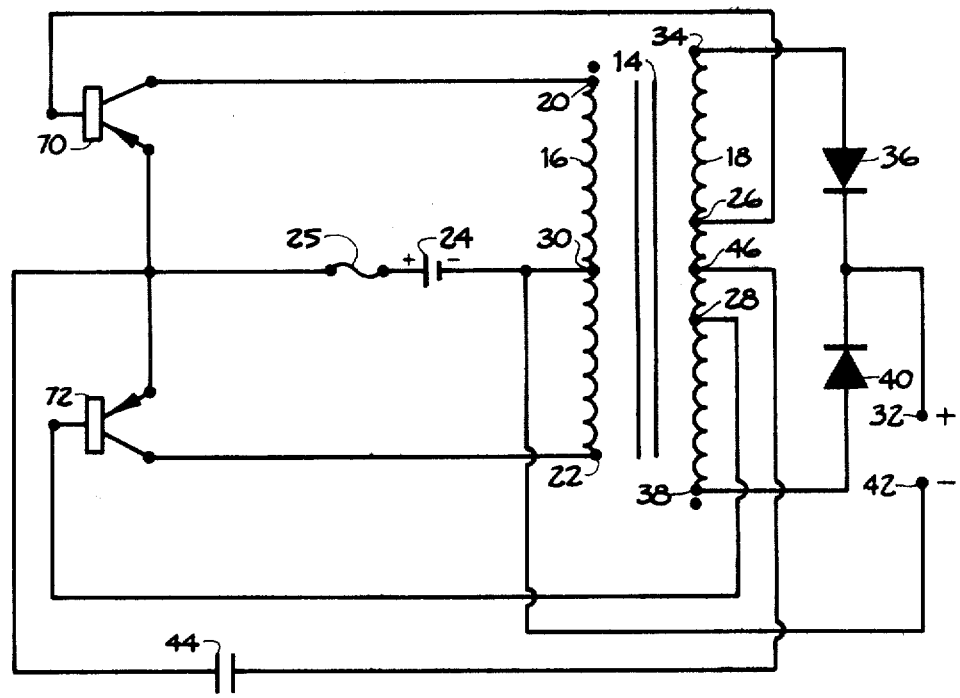
FIG. 3 shows a third embodiment of the converter of the present invention using PNP type transistors.

In FIG. 3, PNP type transistors 70, 72 have replaced the NPN type transistors 10, 12 of FIG. 1. Such a substitution requires the emitter electrodes of the transistors 70, 72 to be connected to the positive terminal of the cell 24. The negative terminal of the cell now being connected to winding 16 and to the negative output connection 42. The positive output connection 32 is now connected to the cathodes of the diodes 36, 40. The anodes of the diodes 36, 40 are connected to secondary winding 18 taps 34 and 38 respectively.

Figure 4:
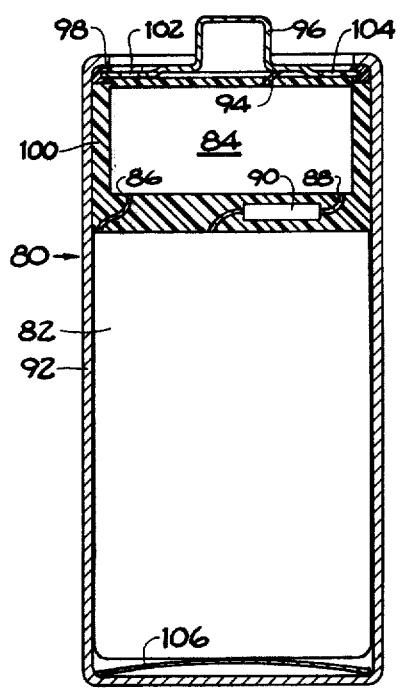
FIG. 4 is a partial cross section of one embodiment of the invention wherein a single cell is incorporated into the battery package.

The use of PNP type transistors 70, 72 permits the negative electrode of the cell 24 which, in many battery systems, is a metal can (shown in FIG. 4) to be in electrical contact with the body of the battery package 80 (shown in FIG. 4). The use of NPN type transistors with negative electrode can cell types as shown in FIG. 1 required an insulator (not shown) between the cell 24 and the battery package 80 adding weight and volume to the battery package 80.

The range of possible loads required to activate the converter circuit of the invention shown in FIGS. 1, 2 and 3 is very large. The largest load is determined by both the ability of the cell 24 to produce the current required and the circuit's ability to handle the current. Since all of the current being generated by the cell 24 passes through the circuit, the transistors 10, 12, or 50, 52 and 54, 56 or 70, 72 must be able to conduct the current without failure.

The smallest load that will activate the converter can be determined beforehand. It can be designed into the circuit through the choice of transistors, converter input voltage, turns ratio and tap locations. The circuit can be designed to remain nonconducting below a preselected load level. The circuit will begin to operate and produce a voltage at the preselected load level. This feature is something not found in batteries. Batteries, when not exhausted, always have a voltage potential across their terminals.

In FIG. 4 of the drawings, a battery package 80 is diagramatically shown as having therein a single cell 82 and a DC to DC converter 84. The DC to DC converter 84 is the circuit shown in FIG. 3 or any other DC to DC converter circuit compatible with the cell 82 such as shown in FIGS. 1 and 2. The cell 82 can be any electrochemical cell, but the preferred cell 82 is a lithium/sulfur dioxide cell of known construction.

In the preferred embodiment of the present invention, the converter 84 is load switching. Three such converter circuits are shown in FIGS. 1, 2 and 3. Load switching is not required for the battery package 80 to function and is not required to be included in the converter 84. If present, it does virtually eliminate the drain on the cell 82 during battery package 80 storage.

Cell 82 and converter 84 are electrically interconnected by suitable conductive means. Suitable conductive means include tabs, strips, or wires 86, 88 from the converter welded or soldered to the cell 82. The cell 82 is connected to the input of the converter 84. A positive portion of the cell 82 is connected by tab 86 through the optional fuse 90 to the emitters of the transistors 70, 72 in the circuit shown in FIG. 3. A negative portion of the cell 82 is connected by tab 88 to the center tap 30 of the primary winding 16 of the inverter transformer 14 shown in FIG. 3 and also to the can 92.

The fuse 90 or means adapted to open when the cell 82 discharges at a rate above a preselected rate, can be fuse wire or a thinned section of the tab 88 between the cell 82 and the converter 84. The fuse 90 is designed to open, thereby protecting the system, should the discharge level of the cell 82 reach a predetermined point, which is beyond its designed discharge rate. Such a rate can be reached if the battery package 80 is short circuited.

The fuse 90 opens through the action of the excess current generated during the unwanted high rate discharge. The current flowing through the fuse 90 heats it up causing a portion of the fuse 90 to melt, thereby opening the circuit between the cell 82 and the converter 84. The fuse 90 is not required in any embodiment of the present invention, but discharging many types of cell (including lithium/sulfur dioxide cells), at too high a rate can severely damage them.

The positive output of the converter 84 is shown electrically connected by suitable conductive means such as a strip, tab or wire 94, to an external electrical connecting means 96. The negative output from tap 30 is connected to the can 92 which is a second electrical connecting means through the negative portion of the cell 82. The electrical connecting means 92, 96 electrically connect the output of the converter 84 to a load. In the embodiment shown in FIG. 4 the positive connecting means 96 also serves as top cover for the battery package 80. The top cover 96 and the can 92 form the battery package 80 casing.

The connecting means 92, 96 are electrically separated from each other by a grommet 98. The cell 82 and converter 84 are insulated from the battery package 80, and held in place within the battery package 80, by a potting compound 100. The potting compound 100 is put into place through two potting holes 103, 104. The potting compound 100 can be wax, epoxy or other suitable, conventional potting compounds compatible with the other components of the battery package 80.

A washer 106 is shown between the bottom of the cell 82 and can 92. The washer 106 insures good electrical contact between the cell 82 and can 92. Further, the washer 106 creates an open space between the cell 82 and can 92 for any gasses that are produced in the unlikely event of the cell 82 venting.

The connecting means 92, 96 of the embodiment shown in FIG. 4 are shown as portions of the battery package 80 casing. They could also be discrete terminals of any type such as male and female snap connectors.

The package 80 can be made in almost any size and shape to fit a particular application. The only requirement is that there be sufficient space within the package 80 for the converter 84 and for a cell 82 of sufficient capacity to supply a device (not shown) using the battery package 80. The ability to use almost any terminal combined with the many possible sizes and shapes of the battery package 80, permits the battery package 80 to be manufactured so that it will be directly interchangeable with known batteries.

The battery package 80 shown in FIG. 4 contains only a single cell 82. This makes cell reversal, which can occur when cells are connected in series, impossible.

Cell recharging from a source outside the battery package which can cause a result similar to cell reversal, can be eliminated by using a converter circuit 84 such as those shown in FIGS. 1, 2 or 3. In the circuits shown in FIGS. 1 and 2, recharging is prevented through the use of diodes 36, 40, whose easy conduction path is from the positive terminal of the cell 24 to the transformer 14 and then to the bases of the transistors 10, 12 or 50, 52, 54, 56. The prevention of cell reversal and the prevention of recharging, are important safety factors in many batteries, including those having a lithium anode.

The use of only a single cell 82, produces a battery package 80 of a much higher reliability than previously known multicelled batteries. This is due to the fact that the load switching converter 84, and most other DC to DC converters are far more reliable than known electrochemical cells. The battery package 80 of the present invention, having only a single cell 82 and the converter 84, is more reliable than a two cell battery, and far more reliable than multicelled batteries of five, ten or one hundred cells.

A battery package 80, containing only one cell 82, such as is shown in FIG. 4, is the preferred embodiment of the present invention. The ability of the converter circuitry, shown in FIGS. 1, 2 and 3, to be varied over a wide range, permits a large variation of output voltages from a single cell 82. Using a lithium/sulfur dioxide cell of known construction with an output of about three volts, an output of from about 6 to about 1500 volts can be obtained from the apparatus of the present invention using only preferred circuit parameters.

In some situations, a multicelled battery package can be desirable (not shown). This can be achieved by connecting the component cells in series or parallel depending on the input voltage and current required. A higher input voltage achieved through the use of two or more cells connected in parallel may increase the efficiency of the circuits shown in FIGS. 1, 2 and 3.

The construction and efficiency of the circuit of FIG. 1 of the present invention will be further illustrated by the following example.

EXAMPLE

The circuit of FIG. 1 was constructed using two silicon power transistors 10, 12. The transistors 10, 12 were connected to the saturable transformer 14. The transformer 14 comprised a center tapped primary coil 16 of 12 turns of wire and a center tapped secondary coil 18 of 130 turns of wire. The secondary 18 was also tapped 16, 28 at 6 turns on either side of the center tap 46. The primary 16 and secondary 18 coils were wound on a plastic bobbin and ferrite core.

The direct current power source 24 was an electrochemical cell with a lithium anode and a sulfur dioxide electrolyte and depolarizer. The cell 24 supplied 2.66 volts to the input of the circuit.

Two capacitors were connected in parallel across the output 32, 42 of the circuit to filter the output. The capacitors were a 10 microfarad electrolytic rated at 35 volts and a 0.1 microfarad ceramic capacitor rated at 25 volts.

Connected to a 392 ohm load, the circuit drew 0.955 amperes at the 2.66 volts produced by the cell 24. This produced a total input wattage of 2.54 watts. The output of the circuit at the load was 28.4 volts and 0.0705 amperes for a total of 2.0 watts. This gave an overall circuit efficiency of 80 percent.

The preceeding description, example and figures are for illustrative purposes only. It is understood that changes and variations in the circuits and battery package can be made without departing from the spirit and scope of the present invention as defined in the following claims.

What is claimed is:

1. A battery package comprising a casing having therein one cell of a type which is subject to damage by cell reversal, said cell having an anode comprising lithium, a DC to DC converter circuit electrically connected to said cell, and means for electrically connecting the output of said converter circuit to a load, said converter circuit comprising means to substantially prevent current flow through said converter circuit unless a load is connected to the output of said converter circuit, whereby said cell discharges only when the load is connected to said converter circuit, said converter circuit being adapted to provide a voltage output substantially in excess of the voltage of the one cell in said package, and said converter circuit including means to electrically prevent recharging of the cell.

2. The battery package of claim 1 wherein the voltage output is a fixed multiple of the cell output voltage.

3. The battery package of claim 1 wherein the ratio of the secondary winding to the primary winding is from about 2:1 to about 50:1.

4. The battery package of claim 1 wherein the cell has a cathode depolarizer comprising sulfur dioxide.

5. The battery package of claim 1 wherein said converter circuit comprises at least one diode whose easy conductance path is from a positive electrode of said cell to a positive portion of said means for connecting said converter circuit whereby recharging of said cell is prevented.

6. The battery package of claim 1 wherein said DC to DC converter circuit includes an inverter transformer having a tapped primary winding and a multiple tapped secondary winding of more turns than the primary winding.

7. The battery package of claim 6 wherein the tap of the primary winding is electrically connected to a positive terminal of said electrochemical cell and to a positive portion of said means for electrically connnecting the output from said converter circuit; and further comprising an oscillating circuit having a pair of transistors, each transistor having an emitter, a base and a collector electrode, the collector electrodes are connected to opposite ends of the primary winding of said inverter transformer respectively, the base electrodes are connected to separate taps on the secondary winding of said inverter transformer and the emitter electrodes are connected to a negative terminal of said electrochemical cell; and a pair of diodes whose anodes are connected to a negative portion of said means for electrically connecting the output from said converter circuit and whose cathodes are connected to opposite ends of the secondary winding of said inverter transformer respectively, the easy conduction path of said diodes being toward the ends of the secondary winding.

8. The battery package of claim 7 wherein each transistor comprises two coupled component transistors each having emitter, collector and base electrodes, wherein the emitter of the first of the coupled transistors is connected to the base of the second coupled component transistor.

9. The battery package of claim 6 wherein the tap of the primary winding is electrically connected to a negative terminal of said electrochemical cell and to a negative portion of said means for electrically connecting the output from said converter circuit; and further comprising an oscillating circuit having a pair of transistors, each transistor having an emitter, a base and a collector electrode, the collector electrodes are connected to opposite ends of the primary winding of said inverter transformer respectively, the base electrodes are connected to separate taps on the secondary winding of said inverter transformer and the emitter electrodes are connected to a positive terminal of said electrochemical cell; and a pair of diodes whose cathodes are connected to a positive portion of said means for electrically connecting the output from said converter circuit and whose anodes are connected to opposite ends of the secondary winding of said inverter transformer respectively, the easy conduction path of said diodes being toward the positive portion of said means for electrically connecting the output from said converter circuit.

10. The battery package of claim 6 wherein the ratio of the primary winding to the portion of the tapped secondary winding connected to the base electrode is such that a voltage produced in the portion of the tapped secondary winding is less than the breakdown voltage between the base and emitter electrodes of the transistor.

* * * * *